United States Patent
Kim et al.

(10) Patent No.: US 9,863,623 B2
(45) Date of Patent: Jan. 9, 2018

(54) LIGHTING DEVICE

(71) Applicant: LG ELECTRONICS INC., Seoul (KR)

(72) Inventors: Jeonghwa Kim, Seoul (KR); Sunghoon Ahn, Seoul (KR); Heegu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/378,616

(22) Filed: Dec. 14, 2016

(65) Prior Publication Data

US 2017/0167709 A1    Jun. 15, 2017

(30) Foreign Application Priority Data

Dec. 15, 2015 (KR) .......................... 10-2015-0178807

(51) Int. Cl.
*F21V 23/06* (2006.01)
*F21V 3/00* (2015.01)
(Continued)

(52) U.S. Cl.
CPC ............... *F21V 23/06* (2013.01); *F21V 3/00* (2013.01); *F21V 23/003* (2013.01); *F21V 25/12* (2013.01);
(Continued)

(58) Field of Classification Search
CPC  H05B 37/02; H05B 37/0227; H05B 37/0272; H05B 37/0245; H05B 33/0854;
(Continued)

(56) References Cited

U.S. PATENT DOCUMENTS 6,388,399 B1 *  5/2002  Eckel ..................... G01K 1/024
                                                       315/158
7,888,875 B2 *  2/2011  Sibout .................... F21V 21/30
                                                       315/291
(Continued)

FOREIGN PATENT DOCUMENTS

KR   20-2009-0006143     6/2009
KR      10-0913922       8/2009
(Continued)

OTHER PUBLICATIONS

Korean Office Action dated May 19, 2017 issued in Application No. 10-2015-0178807.
(Continued)

*Primary Examiner* — Haissa Philogene
(74) *Attorney, Agent, or Firm* — Ked & Associates, LLP

(57) ABSTRACT

A lighting device may include a light irradiation portion, a main control module, and a second connector. The light irradiation portion may generate and irradiates light. The light control portion may control power applied to the light irradiation portion. The main control module may include an antenna to communicate with an external device by a wireless communication and control the light control portion according to a control signal from the external device. The second connector may be provided in the main control module and may connect the main control module and the light control portion by a wired communication. The second connector may include a first printed circuit board having a mode pin (for determining a control mode of the light control portion) and a power pin (for supplying power from the light control portion to the main control module), and a second printed circuit board having a control pin (for supplying a control signal from the main control module to the light control portion).

20 Claims, 7 Drawing Sheets

(51) Int. Cl.
  *F21V 23/00* (2015.01)
  *F21V 25/12* (2006.01)
  *H05B 37/02* (2006.01)
  *F21Y 115/10* (2016.01)

(52) U.S. Cl.
  CPC ..... *H05B 37/0227* (2013.01); *H05B 37/0272* (2013.01); *F21Y 2115/10* (2016.08)

(58) Field of Classification Search
  CPC . H05B 33/0872; F21V 23/06; F21V 23/0471; F21V 23/04; F21V 23/003; F21V 29/80; H01K 1/141; H01K 1/144; H01K 7/026; B60Q 3/80; Y02B 20/48; F21Y 2115/10
  USPC ............... 315/149, 291, 297, 307, 312, 362; 362/256, 277, 294, 545
  See application file for complete search history.

(56) References Cited

U.S. PATENT DOCUMENTS

| | | | | |
|---|---|---|---|---|
| 8,033,686 | B2* | 10/2011 | Recker | ............... H05B 33/0803 362/249.02 |
| 8,952,626 | B2* | 2/2015 | Huang | ............... H05B 37/0272 315/158 |
| 9,024,536 | B2 | 5/2015 | Maxik | |
| 9,289,574 | B2 | 3/2016 | Maxik | |
| 9,295,144 | B2 | 3/2016 | Bora | |
| 9,320,101 | B2 | 4/2016 | Sun | |
| 9,408,282 | B1* | 8/2016 | Springer | ............ H05B 37/0272 |
| 9,536,452 | B2* | 1/2017 | Lydecker | ............ G09B 21/008 |
| 9,538,620 | B2 | 1/2017 | Kim | |
| 9,538,623 | B2 | 1/2017 | Lee | |
| 9,549,110 | B2 | 1/2017 | Chien | |
| 9,603,226 | B2 | 3/2017 | Sagal | |
| 2007/0147017 | A1* | 6/2007 | Eom | ...................... H05K 1/141 361/809 |
| 2015/0327349 | A1 | 11/2015 | Lee | |
| 2017/0130907 | A1 | 5/2017 | Cho | |
| 2017/0167708 | A1 | 6/2017 | Kim | |
| 2017/0167709 | A1 | 6/2017 | Kim | |
| 2017/0171944 | A1 | 6/2017 | Kim | |

FOREIGN PATENT DOCUMENTS

| | | |
|---|---|---|
| KR | 10-1316871 | 10/2013 |
| KR | 10-2014-0056995 | 5/2014 |
| KR | 10-2014-0060675 | 5/2014 |
| KR | 10-2014-0098570 | 8/2014 |
| KR | 10-1439010 | 9/2014 |
| KR | 10-2015-0135862 | 12/2015 |
| KR | 10-1617293 | 5/2016 |

OTHER PUBLICATIONS

U.S. Office Action dated Jul. 17, 2017 issued in co-pending U.S. Appl. No. 15/378,376.
Korean Notice of Allowance dated Feb. 1, 2017 issued in Application No. 9-5-2017-007973831.

* cited by examiner

LIGHTING DEVICE

CROSS-REFERENCE TO RELATED APPLICATION

The present application claims priority under 35 U.S.C. 119 and 35 U.S.C. 365 from Korean Patent Application No. 10-2015-0178807, filed Dec. 15, 2015, the subject matter of which is hereby incorporated by reference.

BACKGROUND

1. Field

Embodiments may relate to a lighting device.

2. Background

A light emitting diode has been widely used rather than an incandescent lamp and/or a fluorescent lamp. The light emitting diode (LED) is a type of semiconductor device that converts electrical energy into light. Since the light emitting diode has advantages that are capable of obtaining low power consumption and semi-permanent lifetime compared to a light source such as fluorescent lamps and incandescent lamps, the light emitting diode may be used as a light source of a lighting device such as various liquid crystal display devices, electric sign boards, and street lamps (used indoors and outdoors).

The light emitting diode may be capable of realizing excellent controllability, fast response speed, high electric/light conversion efficiency, high luminance, and/or emotional illumination. Due to characteristics of these devices, the lighting device using the light emitting diode may be positively controlled depending on time and place.

Technologies for saving more power consumption or for more positively controlling the lighting device according to a user's demand have attracted attention. For example, when a moving body sensor determines that there is no person in a lighting space for a predetermined period of time, then the lighting device may be automatically turned off, and when the moving body sensor determines that there is a person in the lighting space, then the lighting device may be automatically turned on.

In order to positively control the lighting device, a communication device may be mounted on the lighting device such that the lighting device is capable of operating according to a control signal from outside of the lighting device. For example, a communication module mounted on an inside of the lighting device is disclosed in Korean Patent Application No. 10-2014-0028495, filed Mar. 11, 2014 (filed by the present applicant), the subject matter of which is incorporated herein by reference In the above technology, technology is disclosed in which the communication module is mounted on an inside of the lighting device, and the communication module performs communication with a remote control device. This technology may not be introduced separately for a sensor.

Korean Patent Laid-Open Publication No. 10-2014-0098570, filed Jan. 31, 2013, the subject matter of which is incorporated herein by reference, discloses a technology that allows a sensing signal from a sensor to be transmitted to a gateway, and a controller that controls the gateway and thus controls a light irradiation portion. Korean Patent Laid-Open Publication No. 10-2014-0098570 was filed by the present applicant, and includes a technology for a sensor capable of interlocking with the lighting device.

According to this technology, a sensor and a light irradiation portion are separate articles from each other and are independently installed and operated. Accordingly, a separate installer y register the sensor in a complicated process using a controller when installing the lighting device, and may register an operation system of the lighting device according to a sensing state of the sensor. Accordingly, if the sensor, the light irradiation portion, and the communication module are different from each other, then all separate installation processes are to be performed. The installation process may be more inconvenient because the installation process requires not only a hardware installation process but also a software installation process. Therefore, it may be difficult for a user to install the lighting device.

BRIEF DESCRIPTION OF THE DRAWINGS

Arrangements and embodiments may be described in detail with reference to the following drawings in which like reference numerals refer to like elements and wherein.

DETAILED DESCRIPTION

In the following description of embodiments, in order to facilitate understanding, the attached drawings and/or figures may be illustrated in a larger, smaller or modified form, unlike the reality.

Figure 1:
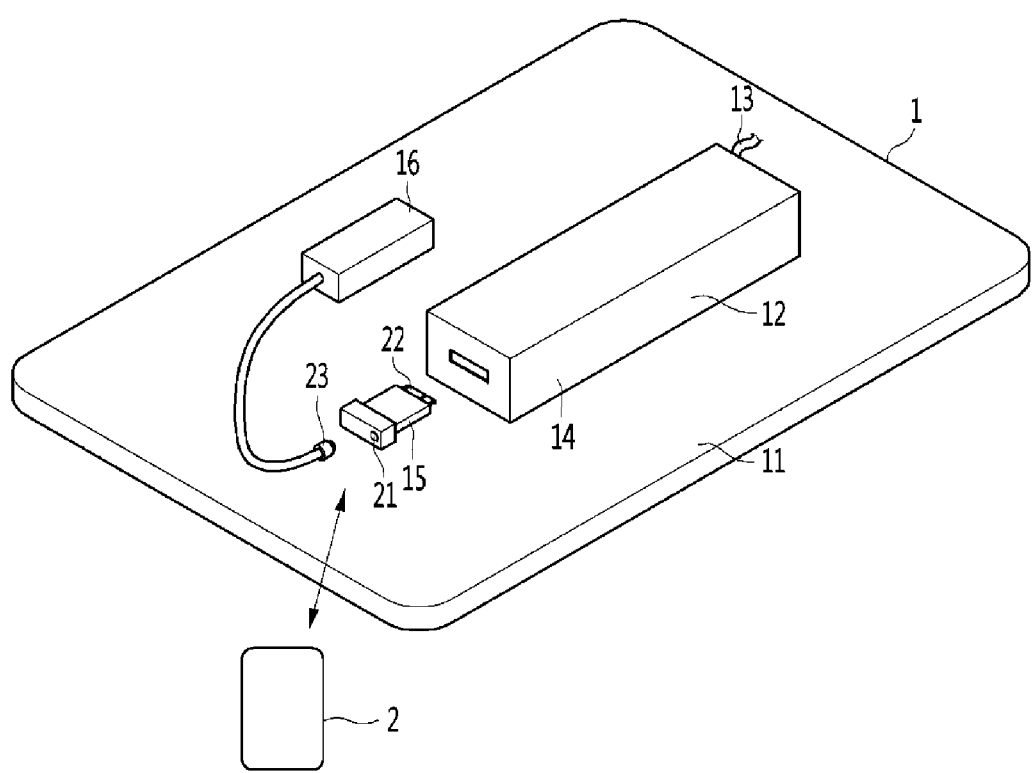
FIG. 1 is a view illustrating an operating state of a lighting device according to an embodiment.

FIG. 1 is a view illustrating an operating state of a lighting device according to an embodiment. Other arrangements and configurations may also be provided.

FIG. 1 shows a lighting device 1 for irradiating light and an external device 2 for transmitting a control signal for controlling the lighting device 1 in various methods using a control factor such as time, illuminance, and/or color. The external device may be a handheld device, for example, but any type of device including an input unit, a control unit (or controller), a memory, and/or a transmitting and receiving unit may be used. The transmitting and receiving unit may be a wireless transmitting and receiving unit.

The lighting device 1 may include a light irradiation portion 11, a light control portion 12, a sensing portion 16 and a main control module 15. The light irradiation portion 11 may irradiate light using a light emitting unit that is capable of being typified by a light emitting diode. The light control portion 12 may transmit light by controlling power applied to the light irradiation portion 11 using a predetermined method. The sensing portion 16 may be provided at one side of the light irradiation portion 11 and may sense various states of the environment on which the light irradiation portion 11 is provided. The main control module 15 may be connected to the light control portion 12 by wired communication, and may be connected to the external device 2 by wireless communication.

The main control module 15 and the sensing portion 16 may be connected (or coupled) in a detachable manner. The main control module 15 may be provided with a first connector 21 and a second connector 22. A connecting member 23 may be provided at an end of a connection line extending from the sensing portion 16. The main control module 15 may be a main control device or apparatus.

The main control module 15 and the light control portion 12 may be connected (or coupled) in a detachable manner. The main control module 15 ay be provided with the second connector 22. The light control portion 12 may include a slot, such as slot 141 shown in FIG. 6.

The sensing portion 16 and the light control portion 12 are fastened to each other such that the sensing portion 16 and the light control portion 12 are detachable from the main control module 15. The specific connecting method of connecting components is not limited to the above described method. A method may be provided in which any one of both components is inserted, both components are connected to each other so that energization is possible, and positions of both components are physically fixed. Both components may be capable of being easily separated by a predetermined external force applied by an operator.

Various types of devices (such as a flat panel illumination, a fluorescent lamp, a down light, and/or a troffer) may be used for the light irradiation portion 11. A commercial power supply 13 may be applied to the light control portion 12, the electricity from the commercial power supply 13 may be regulated in accordance with the control signal from the main control module 15, and the electricity may then be applied to the light emitting unit of the light irradiation portion 11.

The light control portion 12 may be separated from the external environment by a case 14 that prevents foreign material from entering. The case 14 may be made of a metal for shielding electromagnetic waves and preventing fire.

Even if the main control module 15 is fastened to the light control portion 12, at least a portion of the main control module 15 (such as a wireless communication means that includes an antenna) may be exposed to an outside of the light control portion 12 for wireless transmission/reception with the external device 2.

Since the main control module 15 is exposed to outside of the lighting device 1, operations such as replacement of the sensing portion 16 or the main control module 15 may be performed after assembly of the lighting device is completed.

A method of using the lighting device may be described.

The user may select the desired sensing portion 16 at a store, for example. Examples of the sensor (of the sensing portion), which may be selected by the user, may include various type of sensors such as a moving body sensor capable of sensing movement, an illuminance sensor, a temperature sensor, a humidity sensor, a dust sensor, an ultraviolet sensor and/or a gas sensor, for example. A sensor in which two or more of the sensors are installed together may be selected. For example, a sensing portion having both the moving body sensor and the illuminance sensor may be selected. A line may extend in the sensing portion 16, and the connecting member 23 may be provided at an end of the extending line.

The user may select a desired light irradiation portion 11 and a light control portion 12 for controlling the selected light irradiation portion 11. A slot 141 may be provided at the light control portion 12. An installation area for mounting the sensing portion 16 may be provided at one side of the light irradiation portion 11. The sensing portion 16 may be installed downward at a mounting area. For example, the light irradiation portion 11 may be empty, or an edge portion of the light irradiation portion 11 may be an installation area.

The user may select the sensing portion 16, the light irradiation portion 11 and the light control portion 12, desired by the user, by using the main control module 15, and the user may assemble the sensing portion 16, the light irradiation portion 11 and the light control portion 12.

When a lighting device is installed at a desired place and power is applied to the lighting device, and software corresponding to types of a sensor in the sensing portion 16, the light irradiation portion and the light control portion may be read and then the lighting device may be installed. Information corresponding to various sensors, light irradiation portions, and light control portions may be stored, in advance, in memory of the main control module 15.

Thereafter, the lighting device may operate by using the external device 2 in specific and various methods. For example, operations such as on/off, brightness adjustment, and/ or illumination time setting may be performed.

Figure 2:
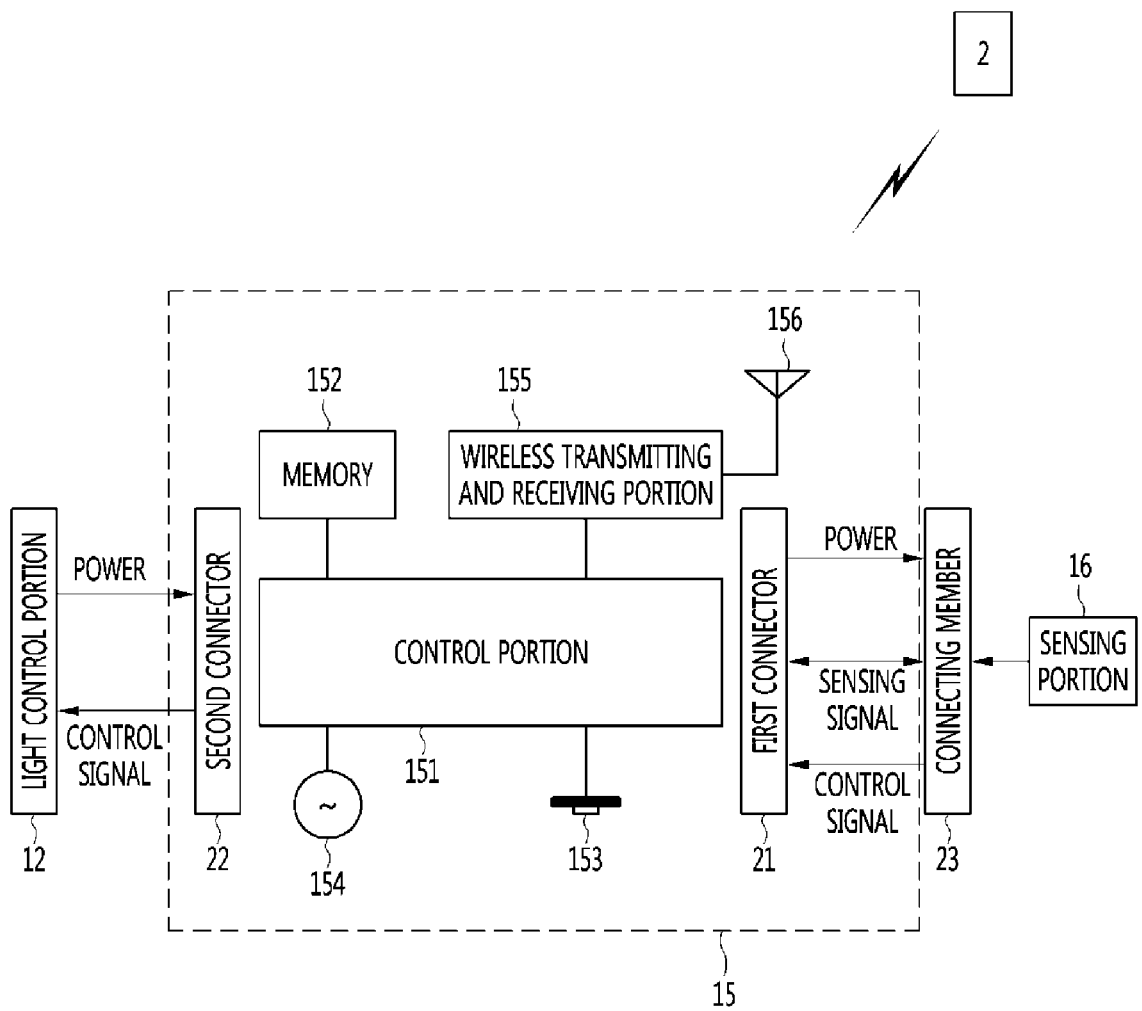
FIG. 2 is a block diagram illustrating a configuration of a main control module.

FIG. 2 is a block diagram illustrating a configuration of the main control module. Other embodiments and configurations may also be provided.

As shown in FIG. 2, the light control portion 12 may be connected (or coupled) to the main control module 15 by a second connector 22 in a wired communication method. The main control module 15 may receive power from the light control portion 12 through the second connector 22, and may transmit a control signal to the light control portion 12 through the second connector 22, and then adjust a light irradiation state of the light irradiation portion 11. Various methods such as DALI, 0-10 light control, PWM, UART, SPI, I2C, and RS-485 may be the wired communication method to perform signal transmission and reception.

The second connector 22 may include a mode pin. The control method of the light control portion 12 may be y based on a signal that is read through the mode pin. For example, when the operation method of the light control portion 12 is pulse width modulation (PWM), then the light control portion 12 may transmit 0 V to the main control module 15 through the mode pin, and the main control module 15 may transmit the control signal to be sent to the light control portion 12 by using the PWM method, by recognizing that 0 V is applied to the mode pin.

The operation mode of the light control portion 12 may be set in advance by software processing and hardware processing, and various communication methods may be stored, in advance, in the main control module 15. The voltage setting of the mode pin may be variously changed according to type of the wired communication method and setting value of the light control portion 12. The mode pin may not be limited to being operated by the voltage value, and a mode may be transmitted by another setting value, such as a specific pulse method.

The sensing portion 16 may be connected to (or coupled to) the main control module 15 (by the wired communication method) by the first connector 21 and the connecting member 23. Power may be transmitted from the main control module 15 to the sensing portion 16 through the first connector 21, and a sensing signal of the sensing portion 16 may be transmitted to the main control module 15. A signal for controlling the sensor of the sensing portion 16 may also be transmitted. Various methods such as DALI, 0-10 light control, PWM, UART, SPI, I2C, and RS-485 may be applied as the wired communication method to perform signal transmission and reception.

Similar to the second connector 22, the first connector 21 may include a mode pin such that operation of the sensor may be reliably performed. For example, by applying different voltages to the mode pins according to types of the sensors, the main control module 15 may identify types of the sensors by using voltages that are applied to the mode pins, controlling the sensor by using different sensing signals from each other according to types of sensors, and recognizing the sensing signal from the sensor. The operation method of the mode pin may not be limited to the voltage value, and a mode may be transferred by another set value, such as a specific pulse type.

The sensing portion 16 may include a switch to which the user may apply an input signal. Because the sensing portion 16 is exposed to the outside, the user may directly perform the operation by the switch. In this example, a control signal from the switch may be transmitted to the main control module 15 through the first connector 21.

The external device 2 may be connected (or coupled) to the main control module 15 in the wireless communication method by an antenna 156. As the wireless communication method, various methods such as ZigBee, Bluetooth, Wi-Fi, and sub-GHz may be applied to perform signal transmission and reception. For example, a ZigBee SoC may be provided as a control portion 151 (or controller) that entirely controls the main control module 15 so that the main control module 15 supports the Zig Bee method, and an EM 357 may be a more specific example.

The main control module 15 may include a quartz 154, which may be for time control of the control portion 151, a switch 165 for performing operations such as setting and resetting of the main control module 15, a memory 152 for storing a plurality of members of information for the antenna 156, and a wireless transmitting and receiving portion 155 for controlling signal transmission and reception through the antenna 156.

Various information may be stored in the memory 152. Therefore, when the sensing portion 16 and the light control portion 12 are replaced, information for the operation thereof may be read and used, and thus the lighting device may be continuously used without replacing the entire components.

When a large amount of information needs to be uploaded to the memory 152, the external storage device may be connected to the first connector 21 to upload the data. The first connector 21 may include a UART port. An advantage may be obtained in terms of time and power consumption as compared with an example of uploading information using the antenna 156 by a wireless communication.

Figure 3:
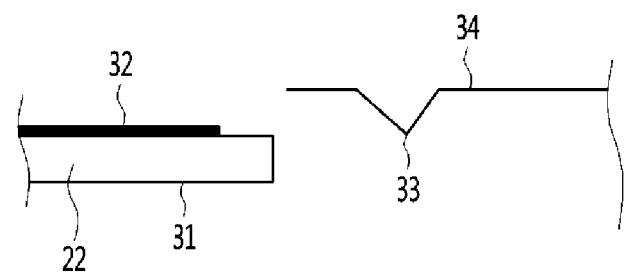
FIG. 3 is a side view illustrating insertion of a second connector.
Figure 4:
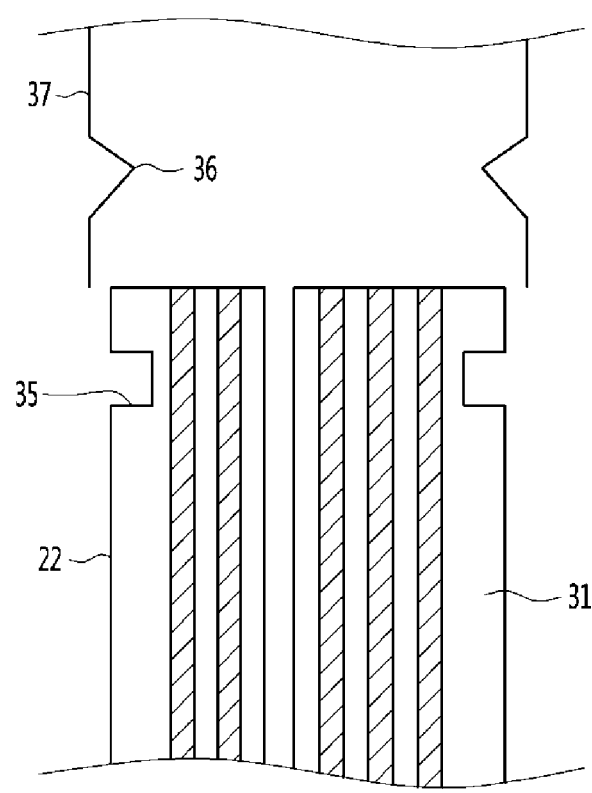
FIG. 4 is a plan view illustrating insertion of a second connector.

FIG. 3 and FIG. 4 are a side view and a plan view illustrating insertion of a second connector, respectively. Other embodiments and configurations may also be provided.

With reference to FIG. 3, the second connector 22 may include a printed circuit board 31, which extends from a main body of the main control module 15 to the outside, and a conductive layer 32, which is printed on an upper surface of the printed circuit board 31. A support member 34 and a contact point 33 may be provided at an inside of the light control portion 12 into which the second connector 22 is inserted.

The contact point 33 may be provided in a configuration in which the support member 34 is bent at an end of the support member 34. The contact point 33 and the conductive layer 32 may be in contact with each other, and thus signals are capable of being transmitted to each other.

Elasticity may be imparted to the support member 34 so as to improve reliability of the contact between the contact point 33 and the conductive layer 32, and thus the support member 34 may be elastically deformed during insertion and separation of the printed circuit board 31.

With reference to FIG. 4, recesses 35 may be formed at both side ends of the printed circuit board 31, and the support member 37 having a latching member 36, which is bent, may be disposed at a position corresponding to the recess 35 when insertion has been completed.

According to the above configurations, the insertion position may be fixed after the printed circuit board 31 is inserted into the support member 37. The printed circuit board 31 may be pulled out by a force that is enough to deform the support member 37.

Figure 5:
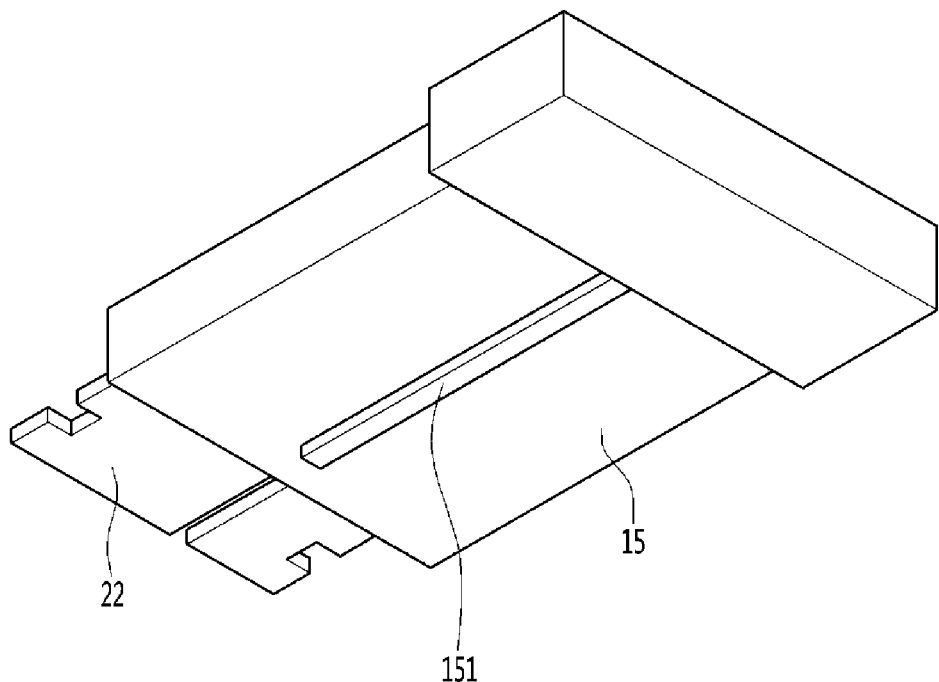
FIG. 5 is a bottom perspective view illustrating a main control module.
Figure 6:
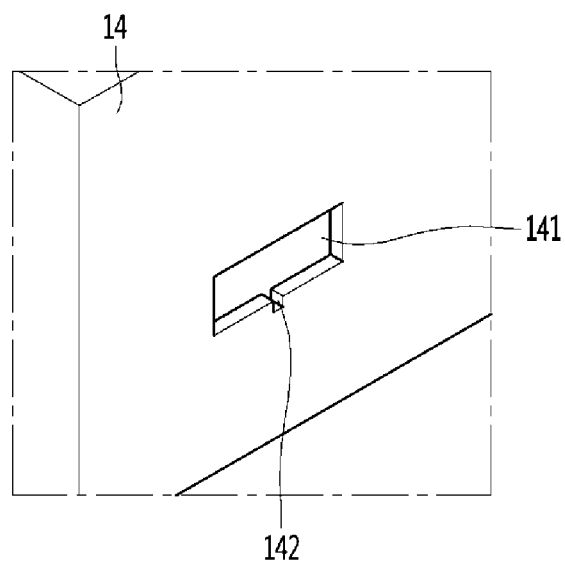
FIG. 6 is an expanded view illustrating a slot into which a second connector is inserted.

FIG. 5 is a bottom perspective view illustrating the main control module. FIG. 6 is an expanded view illustrating a slot in which the second connector is inserted. Other embodiments and configurations may also be provided.

With reference to FIG. 5 and FIG. 6, a rib 151 may extend in a bottom surface of the main control module 15 in a direction in which the main control module 15 is inserted. At a lower long side of the slot 141, an insertion guiding portion 142 may be provided in the form of a groove. When the main control module 15 is inserted into the light control portion 12, the second connector 22 may enter into the slot 141. At this time, the rib 151 may be guided by the insertion guiding portion 142.

In an example in which a vertical direction of the second connector 22 is not aligned with the vertical direction of the slot 141, the rib 151 may not be inserted into the slot 141 by being caught by an outer surface of the slot 141. Therefore, stable conductive coupling between the second connector and the slot may be obtained by the rib 151 and the insertion guiding portion 142. Further, electrical and physical damage of internal components of the light control portion 12 may be suppressed.

The main control module 15 may have a predetermined size and weight because a plurality of components are mounted therein. The weight of the main control module 15 must be stably supported by the light control portion 12 in a state of being fastened to the light control portion 12. Therefore, in order to support the weight of the main control module 15, it may be difficult to use a universal connector; however, the second connector 22 having a predetermined size or larger to support a predetermined weight may be applied.

By using the second connector 22, a stable supporting action may be obtained. The effect of warping (or the like) may be eliminated even by weight of the second connector, so that a stable supporting action may be brought against the conductive contact and the weight of the second connector. The structure of the second connector may be described.

Figure 7:
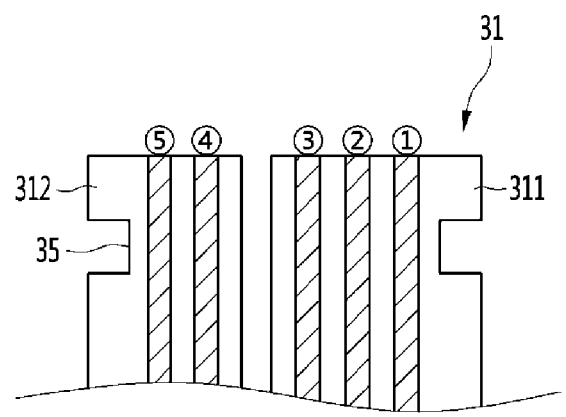
FIG. 7 is an expanded view illustrating a second connector.

FIG. 7 is an expanded view illustrating the second connector. Other embodiments and configurations may also be provided.

As shown in FIG. 7, and as described above, the second connector may include the printed circuit board 31. The printed circuit board 31 may have a plurality of pins. The pins may include a control pin for a control signal, a power pin for power, and/or a mode pin for determining an operation mode of the component.

The control pin may perform a role of transmitting a control signal from the main control module 15 to the light control portion 12. The power pin may perform a role of transmitting power of the light control portion 12 to the main control module 15. The mode pin may perform a role of identifying the control mode of the light control portion 12.

Depending on the role of the pin, the printed circuit board 31 may be divided (or separated) into two portions, namely a first printed circuit board 311 and a second printed circuit board 312. More specifically, the control pin may be provided on the second printed circuit board 312 so that the control signal of the light control portion 12 may be stably transmitted. The power pins may be provided on the first printed circuit board 311 so as not to affect the control signal. This may be to suppress mutual signal interference due to different applied voltages and frequencies of each other.

The mode pin may be provided on the first printed circuit board 311, on which a power pin is provided, since a voltage similar to that of the power pin may be applied. The first printed circuit board 311 and the second printed circuit board 312 may be separated from each other and spaced apart from each other so as to have a waiting space or a physical blocking wall interposed therebetween so as to suppress interference between signals. Different boards may be used for the printed circuit boards.

The user may connect the connectors with each other without confusing the inserting direction, since the first printed circuit board 311 and the second printed circuit board 312 are asymmetrical (in shape) with respect to each other and the circuit boards are provided with a gap between the same planes so as to be spaced apart from each other. Since the inserting is not performed at all when the inserting direction is incorrect, malfunction of the device due to error in the inserting direction may be prevented.

In this embodiment, ① may identify a mode pin, ② and ③ may identify power pins and Vcc, and ④ and ⑤ may identify control pins.

Table 1 and Table 2 are diagrams for describing functions of pins of the printed circuit board 31. Table 1 illustrates an example of a UART mode, and Table 2 illustrates an example of a PWM mode.

TABLE 1

| Pin No. | I/O | Pin Name | Description |
| --- | --- | --- | --- |
| 1 | I | mode sel | UART/PWM mode |
| 2 | — | VDD | power supply |
| 3 | — | GND | Ground |
| 4 | O | UART-Tx | UART data transmit |
| 5 | I | UART_Rx | UART data receive |

TABLE 2

| Pin No. | I/O | Pin Name | Description |
| --- | --- | --- | --- |
| 1 | I | mode sel | UART/PWM mode |
| 2 | — | VDD | power supply |
| 3 | — | GND | Ground |
| 4 | O | PWM1 | PWM signal for dimming control |
| 5 | O | PWM2 | PWM signal for dimming control |

Tables 1 and 2 may be used to determine examples of how to control the light irradiation portion and the light control portion by using either PMW mode or UART mode. This may be accomplished by using a voltage level or specific signal type applied to the main control module 15 through the mode pin ①.

The control mode may not be limited to the two examples that are presented. For example, it is capable of being controlled in other ways such as DALI, 0-10 light control, SPI, I2C, and RS-485.

The power pins ② and ③ may be provided in two lines. Power from the light control portion 12 to the main control module 15 may be supplied in the range of 2.7 V to 3.3 V.

The mode pin and the power pin may be provided on the first printed circuit board 311, and the control pins ④ and ⑤ may be provided on the second printed circuit board. By providing the control pin on a separate printed circuit board, the supply of the control signal may perform a stable control operation without signal interference to the power pin and the mode pin.

The control pin may transmit a UART control signal or a PWM control signal to the light control portion 12 according to a method read from the mode pin.

Figure 8:
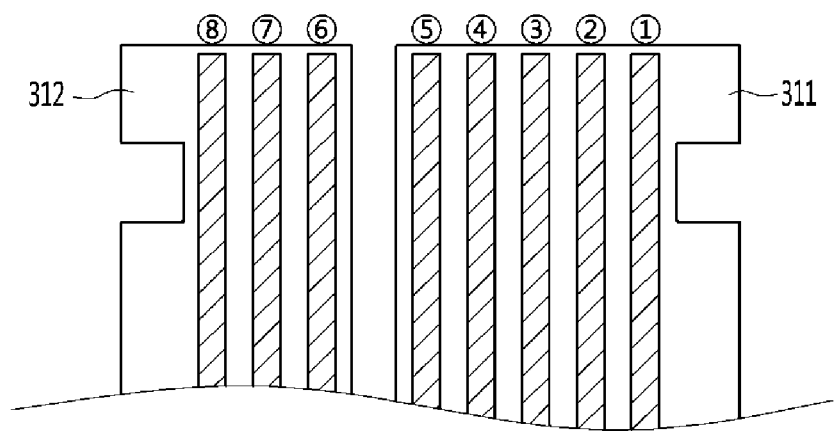
FIG. 8 is an expanded view illustrating a second connector according to an embodiment.

FIG. 8 is an expanded view illustrating a second connector according to an embodiment. Other embodiments and configurations may also be provided.

FIG. 8 shows five pins that may be provided on the first printed circuit board 311, and three pins that may be provided on the second printed circuit board 312. The function of the pins may be described with reference to Table 3.

TABLE 3

| Pin No. | I/O | Pin Name | Description |
| --- | --- | --- | --- |
| 1 | I/O | mode sel | UART/PWM mode |
| 2 | I/O | PWM0 | PWM signal 0 |
| 3 | — | VDD | power supply |
| 4 | I/O | PWM4 | PWM signal 4 |
| 5 | — | GND | ground |
| 6 | I/O | PWM1/UART-Tx | PWM signal 1 or UART-Tx |
| 7 | I/O | PWM3 | PWM signal 3 |
| 8 | I/O | PWM2/UART-Rx | PWM signal 2 or UART-Rx |

Table 3 may be used to determine examples of how to control the light irradiation portion and the light control portion by using either PMW mode or UART mode. This may be accomplished by using a voltage level or specific signal type applied to the main control module 15 through the mode pin ①.

The control mode may not be limited to the two examples that are presented. For example, it is capable of being controlled in other ways such as DALI, 0-10 light control, SPI, I2C, and RS-485.

The power pin may be provided as two pins ③ and ⑤. Power may be supplied from the light control portion 12 to the main control module 15 within a range of 2.0V to 3.6V.

The ②, ④, ⑥, ⑦, and ⑧ pins may be used as control pins. More specifically, functions of the control pins may be described. The control pin ② may be PWM©, the control pin ④ may be PWM4, the control pin ⑥ may perform PWM1 or UART transmission function, the control pin ⑦ may be PWM4, and the control pin ⑧ may perform PWM2 or UART reception function.

When the second connector has eight pins, more various control functions may be performed.

For example, when it is determined by the mode pin that the light control portion 12 is in the PWM control mode, brightness of the light irradiated by the light irradiation portion may be controlled where only the PWM1 is used, color temperature of the light irradiated by the light irradiating unit may be controlled where the PMW1 and PMW2 are used, and color control of the illumination may be performed where PWM1, PWM2, PWM3, and PWM4 are used. Additionally, when PWM0 is also included, feel of other more complex light may be controlled.

As another example, when the rode pin determines that the light control portion 12 is in the UART control mode, the pins ⑥ and ⑧ may be used as pins for UART reception and UART transmission, respectively.

The second connector having five pins shown in FIG. 7 and the second connector having eight pins shown in FIG. 8 may be mutually used.

More specifically, the corresponding relationship of each pin may be capable of being seen through the correspondence table shown in Table 4. The arrangement of the eight pins may be configured by disposing each pin on a position that is capable of satisfying this configuration. For example, the seventh pin in the second connector having eight pins may be capable of being disposed in the region where there is no conductive layer on the interval between the fourth pin and the fifth pin in the second connector having five pins.

TABLE 4

| Second Connector Having Five Pins | Second Connector Having Eight Pins | Function |
| --- | --- | --- |
| 1 | 1 | UART/PWM mode |
| — | 2 | PWM signal 0 |
| 2 | 3 | Power supply |
| — | 4 | PWM signal 4 |
| 3 | 5 | Ground |
| 4 | 6 | PWM signal 1 or UART-Tx |
| — | 7 | PWM signal 3 |
| 5 | 8 | PWM signal 2 or UART-Rx |

As understood from Table 4, regardless of whether the light control portion 12 has a connecting member for the second connector having eight pins or a connecting member for the second connector having five pins, the main control module 15 may be capable of being used. In another example, the light control portion 12 may be capable of being used regardless of whether the second connector has eight pins or five pins.

For example, when the light control portion 12 is not capable of performing color control of illumination and has a function of adjusting only brightness and color temperature because a price thereof is cheap, the connector having eight pins may be capable of being inserted and used. In this example, the second pin, the fourth pin, and the seventh pin (among the eight pins) may not be connected to the light control portion, and thus the function may not be implemented. Accordingly, there is no problem in that the original function of the light control portion is performed.

The light control portion may be controlled using a single eight-pin main control module without disposing the light control portion and light irradiation portion that have been previously used. In an opposite example, the same effect may be obtained, and thus common use of components may be improved.

Therefore, all the light control portions and the main control modules manufactured by the applicant may be shared with each other. Accordingly, the user may be conveniently install and use the lighting device by purchasing the lighting device conveniently for each component.

Figure 9:
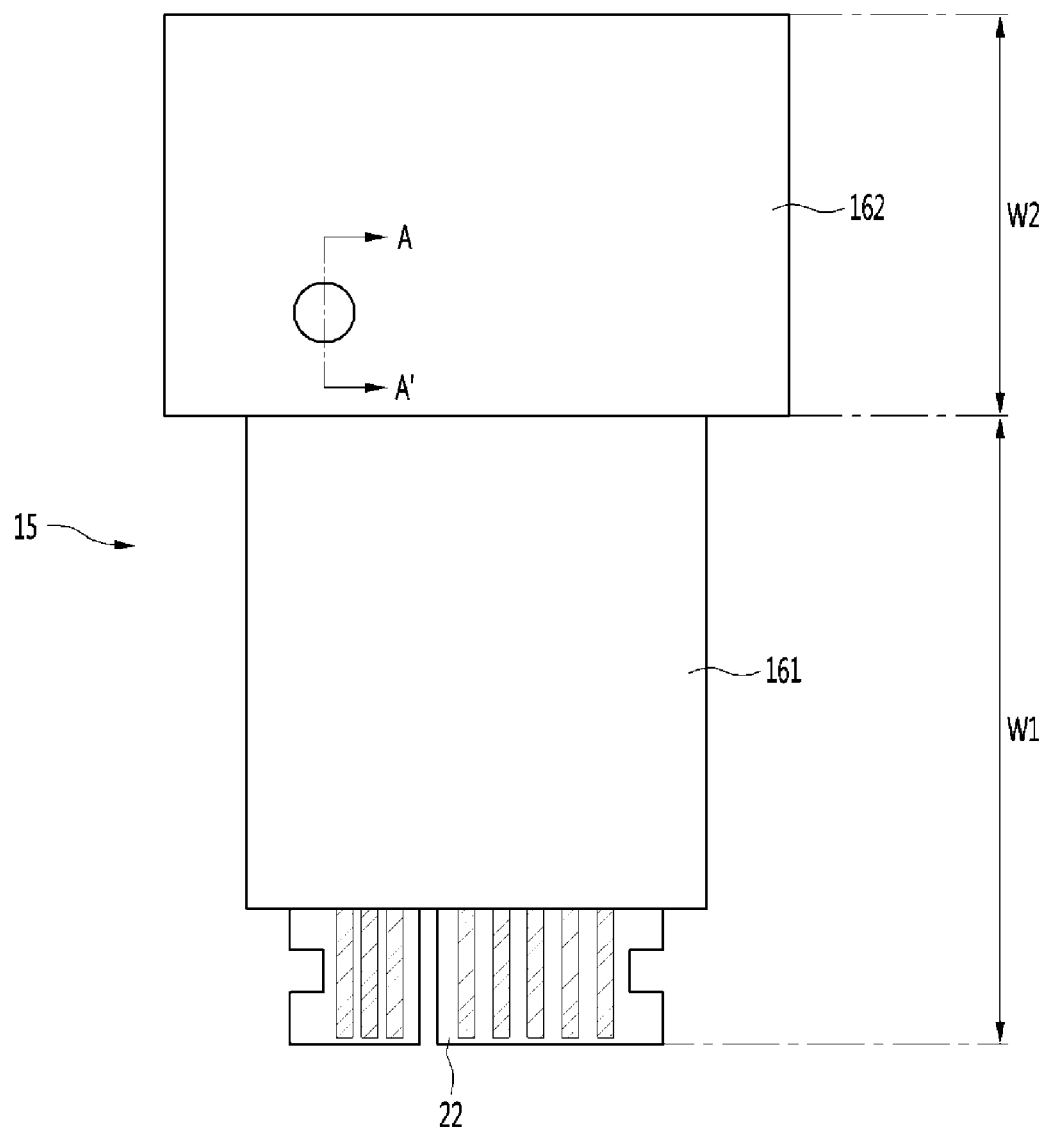
FIG. 9 is a plan view illustrating a main control module.

FIG. 9 is a plan view illustrating the main control module. Other embodiments and configurations may also be provided.

As shown in FIG. 9, the main control module 15 may include an inserting portion 161 that is inserted into the inside of the light control portion 12 and an exposing portion 162 that is exposed to the outside of the light control portion 12. The exposing portion 162 is provided with the first connector 21 to which at least an antenna (e.g., the antenna 156 in FIG. 1) and the sensing portion 16 are connected.

The antenna 156 may be disposed on the outside of the metal case 14 so as not to cause a problem in communicating with the external device 2. Components for operation of the first connector 21 and the main control module 15 may be disposed on the inserting portion 161.

The area W1, on which the inserting portion 161 is disposed, may be inserted into the light control portion 12 so as not to adversely affect appearance of the lighting device. The area W2, on which the exposing portion 162 is disposed, may be exposed to outside the case 14 (made of a metal) so as to prevent interference with wireless transmission and reception operations of the antenna 156.

By using this configuration, the electromagnetic wave caused by the components, disposed on the inside of the inserting portion 161, may be blocked by the metal case 14 so as not to affect the antenna 156 as much as possible. This feature may stably perform the operation of the antenna 156 even at a low output because it is not desirable to make the antenna high output, The exposing portion 162 may include an interface portion for operation and identification. The interface portion may perform operations such as identification of the connection state between the main control module 15 and the light control portion 12 or resetting the operation of the main control module 15 by the user.

Figure 10:
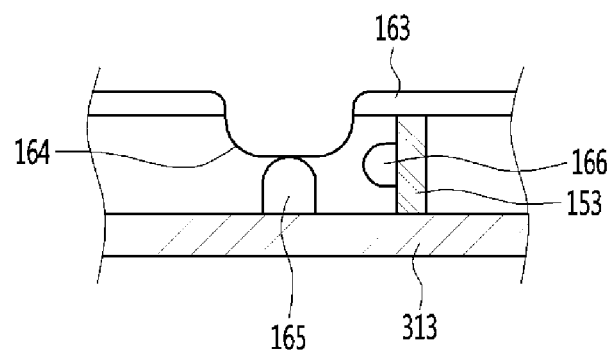
FIG. 10 is cross-sectional view taken along line A-A' in FIG. 9.

FIG. 10 is cross-sectional view taken along line A-A' in FIG. 9. With reference to FIG. 10, a configuration and an operation of the interface portion may be described. Other embodiments and configuration may also be provided.

A portion of the case 163 of the main control module may be opened, and a cover 164 may be provided at the opened portion. A switch 165 may be provided on a lower side of the cover 164. The switch 165 may operate in an operating state by the user pressing the cover 164. For example, the main control module 15 may be reset, as a whole, by intermittently pressing twice.

At least a portion of the cover 164 may be provided in a translucent manner. A light emitting element (LED) 166 may be disposed on an inside of the case 163 adjacent to the cover 164. The light from the light emitting element 166 may project to outside through the cover 164. The user may recognize the light of the light emitting element 166 transmitting through the cover 164 and thereby find out the operation state of the main control module and peripheral devices.

For example, when a red light is projected from the light emitting element 166, operation of the main control module 15 itself or in an interconnection between the light control portion 12 and the main control module 15 may be defined as being in an abnormal state. In an example where green light is projected from the light emitting element 166, connection between the main control module 15 and the light control portion 12 may be defined as being in a normal state.

The switch 165 may be provided in a state of being supported by a third printed circuit board 313, and the light emitting element 166 may be mounted on a supporting wall 153 and may be supported on the third printed circuit board 313. The third printed circuit board 313 may be used as a board connected to the first printed circuit board 311 and the second printed circuit board 312, or the third printed circuit board 313 may be separated from the first printed circuit board 311 and the second printed circuit board 312. The printed circuit boards are described as the first printed circuit board, the second printed circuit board, and the third printed circuit board, respectively, since functions of the first printed circuit board, the second printed circuit board, and the third printed circuit board are different from each other. A distinctive characteristic of the third printed circuit board 313 is positioned at the exposing portion 162.

The first connector 21 may be provided in a direction opposite to the direction in which the second connector extends. The sensing portion 16 may be connected to the first connector 21. The mutual mechanical and electrical interference between connectors may be capable of being suppressed as much as possible by the connectors 21 and 22 being disposed in directions that are opposite to each other.

Figure 11:
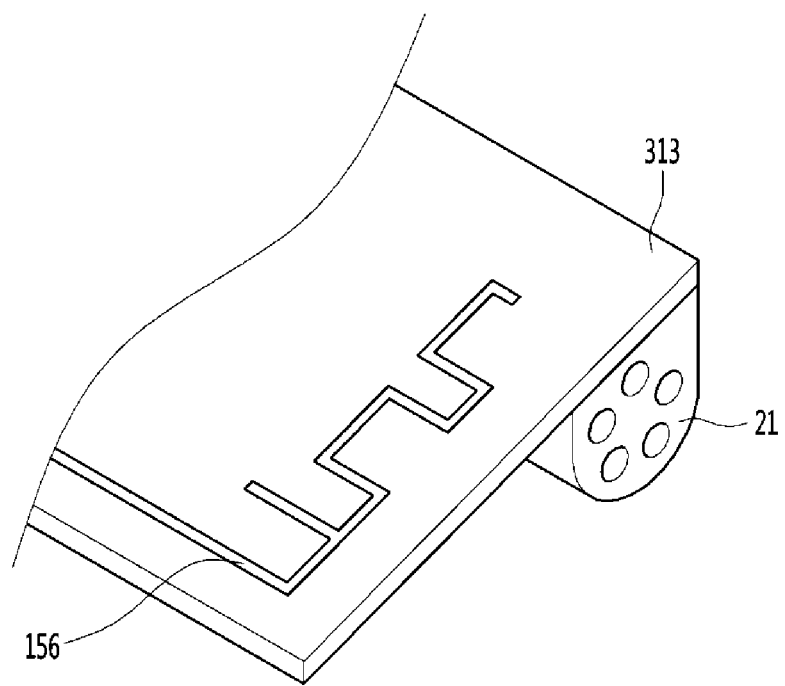
FIG. 11 is a view illustrating a periphery portion of the first connector when it is removed.

FIG. 11 is a view illustrating a periphery portion of the first connector when removed from the main control module 15. Other embodiments and configurations may also be provided With reference to FIG. 11, the first connector 21 is fastened to a lower surface of the third printed circuit board 313, and the antenna 156 is fastened to an upper surface of the third printed circuit board 313 in a predetermined shape. For example, the antenna 156 may be patterned on the third printed circuit board 313. The third printed circuit board 313 may act as a shielding film against electromagnetic waves generated from the first connector 21. Therefore, operation of the antenna 156 may be stably performed.

The first connector 21 may be positioned on a right side of the third printed circuit board 313 (with reference to FIG. 11), and the antenna 156 may be positioned on a left side of the third printed circuit board 313 (with reference to FIG. 11). Therefore, the electromagnetic waves of the first connector 21 may not affect the antenna 156 as much as possible.

According to an example embodiment, a user may be capable of conveniently installing and using the main control module. The operation state of the main control module may be conveniently operated as a brain portion of the lighting device. The wireless transmitting/receiving equipment of the main control module may operate without interfering with other connected devices. Thus, the convenient use and installation of the lighting device may be further facilitated.

Embodiments may propose a lighting device that is capable of being easily installed by a user and may improve commonality of components.

A lighting device may improve operational stability of a main control module.

A lighting device may improve visibility of a user.

The second connector may connect a main control module and a light control portion. The second connector may include a first printed circuit board in which a mode pin for determining a control mode of the light control portion and a power pin for supplying power from the light control portion to the main control module are provided. The second connector may include a second printed circuit board in which a control pin is provided for supplying a control signal from the main control module to the light control portion. This may improve commonality of the main control module so that a user is capable of installing the lighting device simply and conveniently.

The first printed circuit board and the second printed circuit board may be spaced apart from each other on a same plane.

When five pins are provided at the second connector, the five pins may include one mode pin, two power pins, and two control pins. The mode pin may be disposed at an end of the second connector, and the control pin may be disposed at the other end of the second connector.

When eight pins are provided at the second connector, the eight pins may include one mode pin, two power pins, and five control pins. The mode pin may be disposed at an end of the second connector and three control pins of the control pins may be disposed on the other end of the second connector. The pins may be sequentially provided in an order of a control pin, a power pin, a control pin, and a power pin from the mode pin.

Embodiments may further include a first connector that connects a sensing portion and the main control module by a wired communication in order to improve operation stability of the main control module, and the first connector may be disposed in a direction opposite to the second connector.

Embodiments may provide the antenna on a portion exposed to an outside of the light control portion. Embodiments may dispose the connector and the antenna on a portion that is away from each other so as not to disturb communication of the antenna. The communication failure of the antenna may be reduced since influence from the inserting portion, inserted into the inside of the light control portion of the main control module, may be prevented from reaching the exposing portion.

Embodiments may include a cover provided in a portion in which the cover of the main control module is opened, a switch disposed on a lower side of the cover, and a light emitting element disposed on a position adjacent the switch to each other in order to improve visibility and ease of operation of a user.

Even if there is no separate installer, the lighting device may be capable of being installed, the main control module may be capable of being stably operated, and the operation may be capable of being performed while observing an operation state directly by the naked eye of the user.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
   a light irradiation portion to generate light;
   a light control portion to control power applied to the light irradiation portion;
   a control module that includes an antenna to communicate with an external device by a wireless communication, and the control module to control the light control portion based on a control signal from the external device; and
a second connector at the control module, and the second connector to connect the control module to the light control portion by a wired connection,
wherein the second connector includes:
a first printed circuit board having a mode pin and a power pin, wherein the mode pin to receive information for determining a control mode of the light control portion, and the power pin to receive information for supplying power from the light control portion to the control module; and
a second printed circuit board having a control pin, wherein the control pin to provide a control signal from the control module to the light control portion.

2. The lighting device according to claim 1, wherein the second printed circuit board is spaced apart from the first printed circuit board, and the second printed circuit board is on a same plane as the first printed circuit board.

3. The lighting device according to claim 2, wherein the second printed circuit board has an asymmetric structure as the first printed circuit board.

4. The lighting device according to claim 2, wherein the second connector includes five pins at one edge region of the second connector, and
wherein the five pins include one mode pin, two power pins, and two control pins at the one edge region of the second connector.

5. The lighting device according to claim 4, wherein the mode pin is at a first end of the edge region of the second connector and the control pin is at a second end of the edge region of the second connector.

6. The lighting device according to claim 2, wherein the second connector includes eight pins at the edge region of the second connector, and
wherein the eight pins include one mode pin, two power pins, and five control pins at the one edge region of the second connector.

7. The lighting device according to claim 6, wherein the mode pin is disposed at a first end of the edge region of the second connector, and
wherein three control pins of the five control pins are disposed at a second end of the edge region of the second connector.

8. The lighting device according to claim 7, wherein the eight pins are in a sequential order of a control pin, a power pin, a control pin, and a power pin.

9. The lighting device according to claim 1, further comprising:
a sensing portion to sense an environment of a space that receives light from the light irradiation portion; and
a first connector to couple the sensing portion to the control module.

10. The lighting device according to claim 9, wherein the first connector is disposed at a first side of the control module, and the second connector is disposed at a second side of the control module.

11. The lighting device according to claim 9, comprising a third printed circuit board and a conductive portion, and
wherein the antenna is provided at a first surface of the third printed circuit board, and the conductive portion is provided at a second surface of the third printed circuit board.

12. The lighting device according to claim 11, wherein the first connector is disposed at a first side of the third printed circuit board, and
wherein the antenna is disposed at a second side of third printed circuit board.

13. The lighting device according to claim 9, wherein the control module is separated into an inserting portion and an exposing portion, wherein the inserting portion is to be provided into the light control portion, and the exposing portion is to be exposed to an outside of the light control portion, wherein the inserting portion is part of the second connector, and the exposing portion includes the antenna.

14. The lighting device according to claim 13, wherein the exposing portion includes:
a cover;
a switch at one side of the cover; and
a light emitting element at a position adjacent to the switch.

15. The lighting device according to claim 1, wherein the first printed circuit board and the second printed circuit board are provided as a single board.

16. A lighting device, comprising:
a light irradiation portion to generate provide light;
a light control portion to control power applied to the light irradiation portion;
a sensing portion to sense an environment of a space that receives light from the light irradiation portion; and
a control module that includes an antenna to communicate with an external device by a wireless communication, and the control module to control the light control portion based on a control signal from the external device, wherein the control module includes:
a second connector to connect the control module to the light control portion by a wired connection; and
a first printed circuit board having a power pin for supplying power from the light control portion to the control module, and a second printed circuit board having a control pin for supplying a control signal from the control module to the light control portion, wherein a first connector to connect the sensing portion to the control module by a wired connection.

17. The lighting device according to claim 16, wherein the first connector is disposed at a first side of the control module, and the second connector is disposed at a second side of the control module.

18. A lighting device, comprising:
a light irradiation portion to generate provide light;
a light control portion to control power applied to the light irradiation portion; and
a control module that includes an antenna to communicate with an external device by a wireless communication, and the control module to control the light control portion based on a control signal from the external device, wherein the control module includes:
an inserting portion to be inserted into the light control portion; and
an exposing portion that includes the antenna, and the exposing portion is exposed to an outside of the light control portion.

19. The lighting device according to claim 18, comprising a third printed circuit board, and
wherein the antenna is provided at a first surface of the third printed circuit board and a conductive portion of the first connector is provided at a second surface of the third printed circuit board.

20. The lighting device according to claim 18, wherein the second connector is coupled to the light control portion by a wired connection, and the first connector is coupled to the sensing portion that senses an environment of a space that receives light from the light irradiation portion.

\* \* \* \* \*